United States Patent
Wuertz et al.

(12) 
(10) Patent No.: US 6,460,863 B1
(45) Date of Patent: Oct. 8, 2002

(54) WELDING FIXTURE

(75) Inventors: William J. Wuertz, Lyndhurst; Ronald K. Fisher, Jr., Rootstown, both of OH (US)

(73) Assignee: Swagelok Company, Willoughby, OH (US)

( * ) Notice: Subject to any disclaimer, the term of this patent is extended or adjusted under 35 U.S.C. 154(b) by 0 days.

(21) Appl. No.: 09/531,059

(22) Filed: Mar. 20, 2000

Related U.S. Application Data

(63) Continuation of application No. PCT/US00/00302, filed on Jan. 6, 2000.
(60) Provisional application No. 60/114,999, filed on Jan. 6, 1999.

(51) Int. Cl.⁷ ............................................. B23B 31/10
(52) U.S. Cl. ........................ 279/141; 279/91; 279/133; 269/287; 219/161
(58) Field of Search ................... 279/8, 9.1, 89–91, 279/141, 133; 269/6, 243, 254 CS, 287; 219/161

(56) References Cited

U.S. PATENT DOCUMENTS

| | | | | | |
|---|---|---|---|---|---|
| 2,472,399 A | * | 6/1949 | Bolduc | ........................ | 279/8 |
| 4,178,189 A | * | 12/1979 | Mancini et al. | ............... | 279/89 |
| 5,088,169 A | * | 2/1992 | Touzet | ........................ | 279/89 |
| 5,167,478 A | * | 12/1992 | Ramunas | ..................... | 279/89 |
| 5,309,801 A | * | 5/1994 | Markle | ........................ | 279/89 |
| 5,497,539 A | * | 3/1996 | Blodgett et al. | ............... | 279/89 |
| 5,718,423 A | * | 2/1998 | Blodgett et al. | ............... | 279/89 |

* cited by examiner

Primary Examiner—Steven C. Bishop
(74) Attorney, Agent, or Firm—Calfee, Halter & Griswold, LLP

(57) ABSTRACT

A fixture for receiving and retaining a fitting having a through bore and an end wall. The fixture comprises a body for receiving the fitting, and an actuator for engaging the fitting at the intersection of the through bore and the end wall such that the fitting is held securely between the body and the actuator.

15 Claims, 4 Drawing Sheets

WELDING FIXTURE

This is a continuation of International Application PCT/US00/00302, with an international filing date of Jan. 6, 2000 and which designated the U.S., itself claiming priority to U.S. provisional application Ser. No. 60/114,999 filed Jan. 6, 1999, the disclosures of which are both incorporated by reference herein.

The present invention is directed to a fixture for retaining a fitting such as for example a ferrule, and more particularly, to a fixture for retaining a fitting during orbital welding operations.

BACKGROUND OF THE INVENTION

Piping systems are commonly used to convey sanitary materials, such as food, dairy, or bioprocessing materials. Such piping system are preferably quickly and easily disassembled for cleaning. To accomplish this, the piping system may be divided into several short segments, and each segment may be connected to an adjacent segment by a coupling component. Each pipe length preferably has a sanitary ferrule at either or each of its ends, and the ferrule provides a flange surface to receive a seal therein. When it is desired to clean the piping system, each length of pipe is uncoupled from the adjacent lengths, and each pipe segment may be individually steam cleaned. Upon re-assembly, the mating seals in the sanitary ferrules provide a fluid-tight seal.

When installing a piping system as described above, a worker must normally weld a sanitary ferrule to each end of each length of pipe. However, difficulties arise in effectively gripping and locating the sanitary ferrule for orbital welding operations. For example, prior art welding systems often require the ferrule to have a relatively long body portion or tube end to provide sufficient area for gripping the ferrule. The extra length of the ferrule increases the cost of materials. Additionally, many prior art fixtures grip the sanitary ferrule on its inside diameter, or on the inside surface of the flange of the ferrule that receives the flange seal. However, gripping the sanitary ferrule on its inner diameter may mar or scratch the surface, which can entrap the materials passing through the piping system. Furthermore, gripping the ferrule on its inner flange surface can in some instances compromise the seal of the assembled piping system.

Accordingly, there is a need for a fixture for gripping a sanitary ferrule that can grip a relatively short tube end type ferrule, and that does not grip the ferrule on its inner diameter or its inner flange surface.

SUMMARY OF THE INVENTION

The present invention is a welding fixture which can effectively grip or hold a tubular ferrule of a relatively short axial length, and which grips the ferrule without contacting the inner diameter or the inner flange surface.

More particularly, the present invention is a fixture for receiving and retaining a fitting having a through bore and an end wall. The fixture comprises a body for receiving the fitting, and an actuator for engaging the fitting at the intersection of the through bore and the end wall such that the fitting is held securely between the body and the actuator.

Other advantages and benefits of the invention will become apparent to those skilled in the art upon reading and understanding of the attached specification, including the drawings and claims.

DETAILED DESCRIPTION

Figure 1:
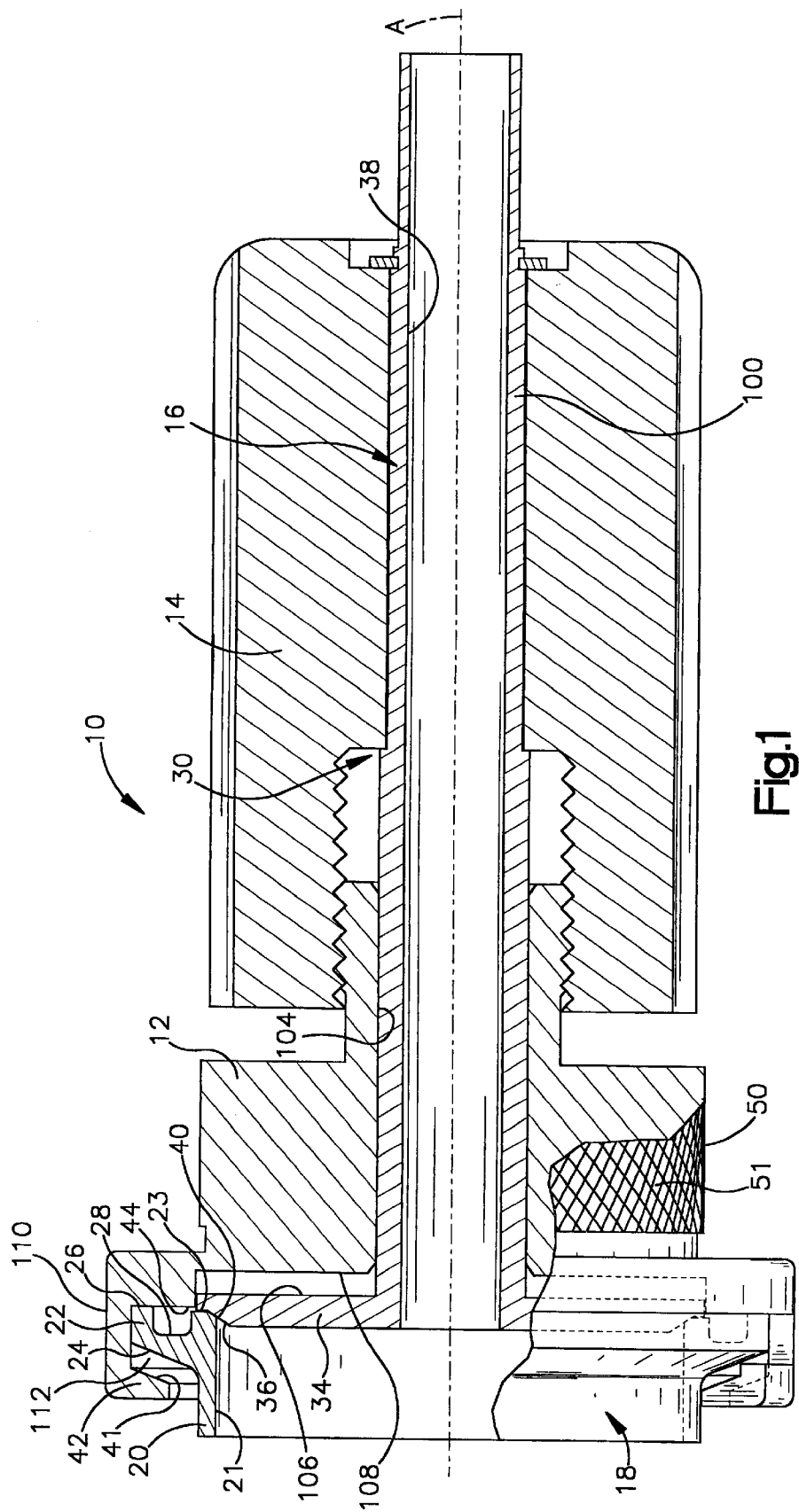
FIG. 1 is a side, partial cross-sectional view of one embodiment of the fixture of the present invention, with a fitting therein.
Figure 2:
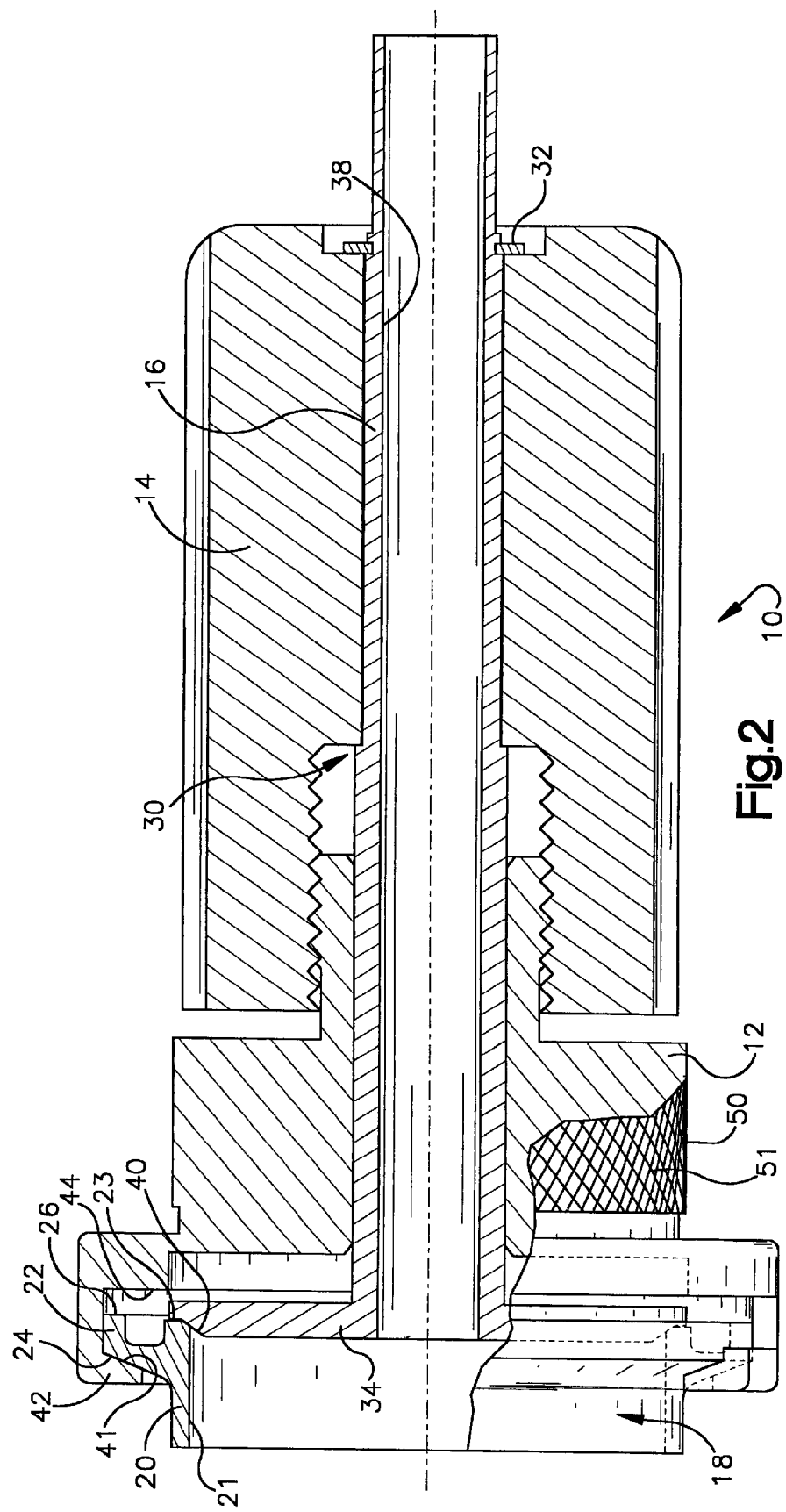
FIG. 2 is a side, partial cross-sectional view of the fixture and fitting of FIG. 1, shown in the gripping position.

As shown in FIGS. 1–2, the fixture 10 of the present invention includes a body 12, a handle 14 and an actuator 16. The fixture 10 is shaped to releasably receive a fitting 18 having a cylindrical portion or tube stub end 20 and a generally radially outwardly-extending flange 22. The fitting 18 has a through bore 21 and an end wall 23. The flange 22 has an outer surface 24 and inner surface 26, and the inner surface 26 has a groove 28 to receive a seal (not shown) therein.

The body 12 includes a threaded stem 100 to which is threadedly attached the handle 14, such that relative rotation of the body 12 and handle 14 causes the handle 14 axially to advance or retract relative the body 12. The body 12 may include a gripping outer surface 50 that may be roughened or knurled as at 51. The actuator 16 is rotatably coupled to the handle 14 so that the handle can impart axial movement and force to the actorator 16. In the illustrated embodiment, the handle 14 engages the actuator 16 at a shoulder 30 formed in the actuator stem 100, such that when the handle 14 is advanced toward the body 12, the handle 14 pushes against the shoulder 30 and the actuator 16 is moved in the same direction. For convenience, the actuator 16 is coupled to the stem 100 by a retaining snap ring 32, which couples the handle 14 and the actuator 16 for movement in the opposite axial direction (to the right as viewed in FIG. 1). Of course, other manners of coupling the actuator 16 and handle 14 may be used without departing from the scope of the invention and it is not required that the two be coupled.

The actuator 16 includes a generally circular end plate 34 having a chamfered portion 36 near its outer end. The actuator 16 is preferably hollow, and has a flow passageway 38 formed therein. The stem 100 end opposite the plate 34 may be connected by any convenient arrangement to a source of purge gas (not shown) during a welding operation. This purge gas will flow completely through the actuator 16 and pass into the ferrule 18 interior during a welding operation.

As assembled, the actuator 16 is coaxially disposed inside the body 12 along a central longitudinal axis A. The actuator stem 100 is slidably inserted through a bore 104 in the body 12, and a rear shoulder 106 if the plate 39 may bottom against a counterbore 108 within the body 12.

Figure 3:
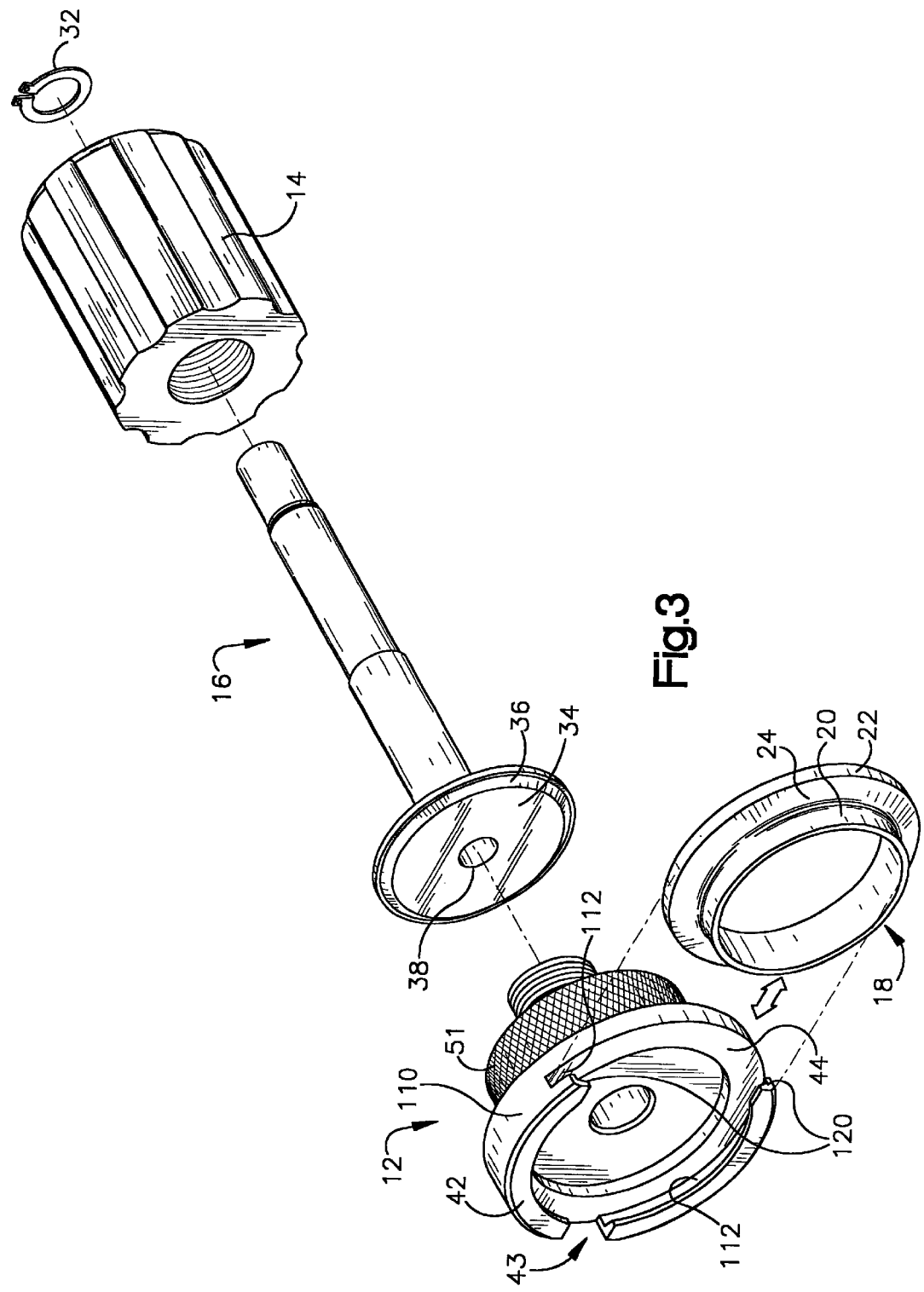
FIG. 3 is an exploded, perspective view of the fixture and fitting of FIG. 2.

The fitting 18 may have a chamfered surface 40 at the intersection of the through bore 21 and the end wall 23. Alternately, the intersection of the through bore 21 and end wall 23 may be a square corner, or radiused, or may have other shapes and profiles. The body 12 includes generally cylindrical wall 110 having a lip portion 42 on its outer periphery that is shaped to engage the outer surface 24 of the flange 22. A rim 44 extends around the body 12, generally parallel to the lip portion 42. The lip 42, wall 110 and rim 44 together define a slot 112 or pocket into which the flange 22 is installed. As shown in FIG. 3, the lip 42 and the wall 110 do not extend around the entire periphery of the body 12. The lip 42 and the wall 110 include at least one arcuate discontinuity 120 large enough to allow the fitting 18 to be slid laterally between the lip 42 and the rim 44 of the body 12 into the slot 112. The lip 42 also has a discontinuity or gap 43 shaped to allow a weld head to be received about the fixture 10 and fitting 18 during welding operations.

In order to hold a fitting 18 in the fixture 10, the actuator 16 is axially retracted sufficiently to allow the fitting 18 to be received in the slot 120 between the lip 42 and the rim 44. The fixture 10 is shown in this position in FIG. 1. The actuator 16 is retracted by manually rotating the handle 14, which retracts the actuator 16 via the retaining ring 32. Once plate 34 of the actuator 16 is sufficiently retracted, the fitting 18 is laterally slid in place into the slot 120 in the body 12 (FIG. 3). The handle 14 is then rotated in the opposite, or clockwise direction, which causes actuator 16, via the shoulder 30, to move in the opposite direction or left as viewed in FIGS. 1 and 2. Once the plate 34 of the actuator 16 is moved into contact with the fitting 18, the chamfered surface 36 of the actuator 16 engages the fitting 18 at the intersection of the through bore 21 and end wall 23. The fitting 18 is axially displaced such that the outer surface 24 of the flange is snug and axially loaded against the inner surface 41 of the lip 42 (FIG. 2). When the fitting 18 is securely held in place between the actuator 16 and the lip of the body 42, the fitting 18 is thereby secured in the fixture 10.

The fixture 10 and fitting 18 may then be placed in a conventional fixture block (not shown) such as fixture blocks sold by Swagelok Company as part of the Swagelok Welding System for welding the fitting to another component. An example of this block is sold by Swagelok Company as Part No. SWS-20TFB-A and is shown in U.S. Pat. No. 4,973,823 owned by Swagelok Company and incorporated herein by reference. The body 12 has an outer diameter 50 that is matched with the gripping inner diameter of, the fixture block. The body 12 has a length sufficient such that the fitting 18 can be centered within the fixture block, thereby eliminating the need to weld at an offset from the center of the fixture block. A pin or other locating means may be formed on the fixture and/or fixture block to ensure proper positioning of the fixture 10 in the fixture block.

Figure 4:
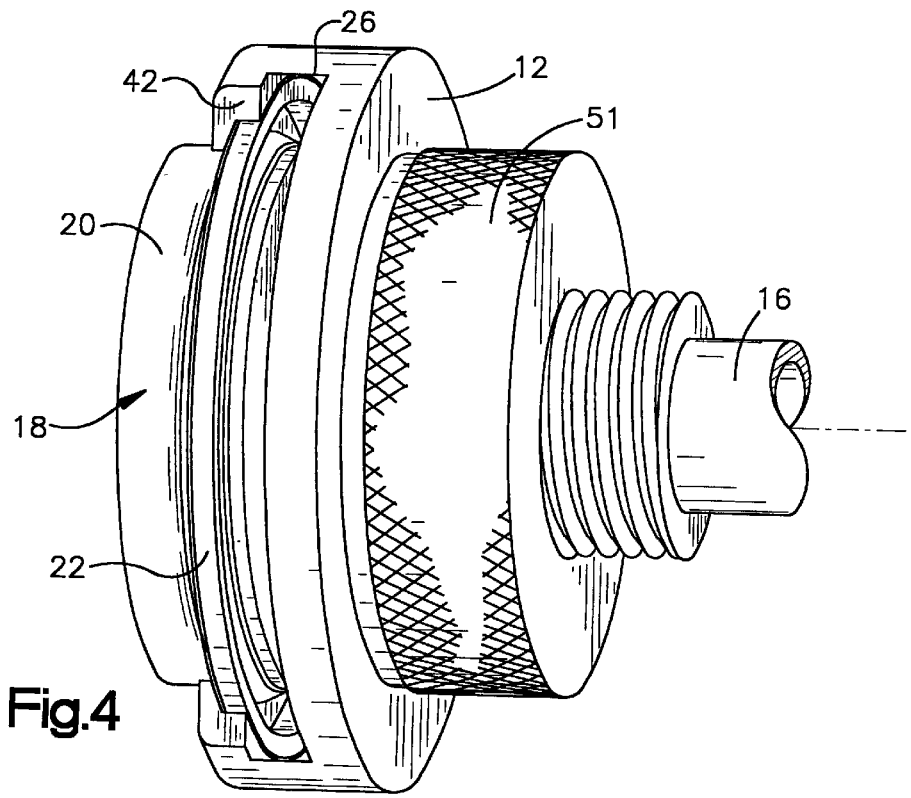
FIG. 4 is a perspective view of the fixture and fitting of FIG. 2.
Figure 5:
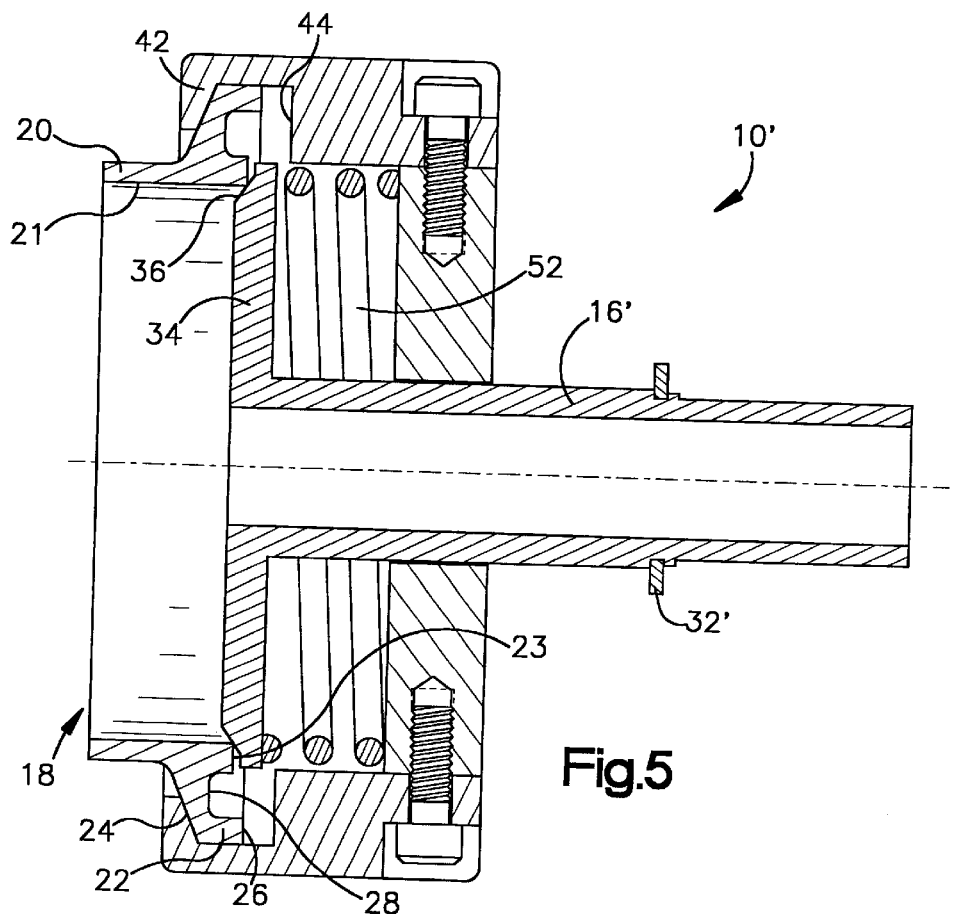
FIG. 5 is a cross-sectional side view of an alternate embodiment of the fixture, shown gripping a fitting.

An alternate embodiment of the fixture 10 of the present invention is shown in FIG. 5. In the illustrated embodiment, the actuator 16 is mounted, in a spring biased manner, within the body 12. In order to mount a fitting 18 in the fixture 10', the actuator 16 is moved to its retracted position, which further compressing the spring 52. The fitting is then passed through a lateral opening such that it is radially aligned with the body 12. In order to secure the fitting 18, the force holding the actuator 16 in the retracted position is removed. The actuator 16 is urged forwardly by the spring 52 until the chamfered surface 36 engages the fitting at the intersection of the through bore 21 and end wall 23, as shown in FIG. 4. In this position, the outer surface 24 of the flange is pressed against the inner surface 41 of the lip 42, and the fitting 18 is secured in the fixture 10'. The compression spring 52 maintain the fitting 18 trapped between the actuator 16 and the body 12, and a retaining ring 32' retains the actuator in the body 12 when there is no fitting in the fixture 10'.

The preferred form of the present invention has been described above. However, with the present disclosure in mind it is believed that obvious alterations to the preferred embodiments, to achieve comfortable features and advantages, will become apparent to one of ordinary skill in the art.

What is claimed:

1. A fixture for holding a ferrule of the type having a tube end and a radial flange with the flange having a seal groove, the fixture comprising:

a generally cylindrical body having a slot that receives the ferrule flange;

and an actuator connected to said body;

said actuator being operable to apply an axial force to the ferrule to hold the ferrule in said body, said actuator being operable to release said axial force to permit the ferrule to be removed from said body;

said actuator having a tapered surface that engages said ferrule to center the ferrule within said body.

2. The apparatus of claim 1, wherein said body slot is defined by a generally cylindrical wall and a radially inward lip, said lip engaging an outer surface of the flange when said actuator axially forces the flange against said lip.

3. The apparatus of claim 2, wherein said generally cylindrical wall includes an arcuate opening through which the flange is inserted and withdrawn from said slot.

4. The apparatus of claim 3, wherein the flange is inserted into said slot in a direction substantially transverse a longitudinal axis of said body and actuator.

5. The apparatus of claim 1, wherein said actuator is spring biased to apply an axial load against the flange to clamp the flange within said slot.

6. The apparatus of claim 1, wherein the ferrule tube end extends outside said slot and is accessible for orbital welding.

7. The apparatus of claim 6, wherein said tube end is less than 3 inches in length.

8. The apparatus of claim 6, wherein said tube end is less than 1 inch in length.

9. The apparatus of claim 1, wherein said actuator comprises an end plate that engages the ferrule flange outside the flange seal groove, said actuator comprising an axially extending stem having said plate at one end.

10. The apparatus of claim 9, wherein said actuator stem is hollow to permit purge gas to pass through to the ferrule during welding.

11. The apparatus of claim 9, comprising a handle on said stem and threadebly connected to said body, said actuator being axially displaced to clamp the flange in said slot when the handle is rotated in a first direction, and said actuator releasing axial force against the flange when said handle is rotated in a second direction.

12. The apparatus of claim 1 wherein said actuator comprises an end plate that engages the ferrule radial flange; said actuator having an axially extending stem with said end plate at one end thereof.

13. The apparatus of claim 12 wherein said tapered surface is on said end plate.

14. The apparatus of claim 13 wherein said tapered surface contacts an inner diameter of the ferrule tube end away from the flange seal groove.

15. A fixture for holding a ferrule of the type having a tube end and a radial flange with the flange having a seal groove, the fixture comprising:

a generally cylindrical body having a slot that receives the ferrule flange;

and an actuator connected to said body;

said actuator being operable to apply an axial force to the ferrule to hold the ferrule in said body, said actuator being operable to release said axial force to permit the ferrule to be removed from said body; said actuator having an axially extending stem and an end plate at one end of said stem, wherein said stem is hollow to permit purge gas to pass through to the ferrule during welding.

* * * * *